Dec. 17, 1957   M. E. FRY   2,816,999
DOMESTIC APPLIANCE
Filed Jan. 14, 1955   2 Sheets-Sheet 1

INVENTOR.
Millard E. Fry
BY R R Candor
HIS ATTORNEY

Dec. 17, 1957 M. E. FRY 2,816,999
DOMESTIC APPLIANCE
Filed Jan. 14, 1955 2 Sheets-Sheet 2

INVENTOR.
Millard E. Fry
BY R R Candor
HIS ATTORNEY

United States Patent Office 2,816,999
Patented Dec. 17, 1957

2,816,999

DOMESTIC APPLIANCE

Millard E. Fry, Dayton, Ohio, assignor to General Motors Corporation, Detroit, Mich., a corporation of Delaware Application January 14, 1955, Serial No. 481,730

6 Claims. (Cl. 219—20)

This application is a continuation-in-part of my co-pending application S. N. 466,027 filed November 1, 1954.

This invention relates to a domestic appliance and more particularly to control systems for surface heaters responsive to the temperature of the pan upon the heater.

There is now great interest in providing control systems for surface heaters responsive to the temperatures of the pan on the heater. Difficulty is involved in providing a system with the proper control in the boiling range as well as the complete low and high temperature ranges above and below the boiling range.

It is an object of this invention to provide a control which at all times will bring the pan quickly to the proper temperature and keep it at that temperature without seriously overheating or overshooting and to provide a wide selection of boiling rates and heating rates co-ordinated with the selected temperature of operation.

It is another object of this invention to provide an inexpensive thermostatic control system which will retain its calibration throughout its normal life and which will provide satisfactory heating rates when controlling a star connected three element standard surface heater.

It is another object of this invention to provide a simple inexpensive reliable relay which may easily be controlled by a small low voltage current for controlling a surface heater of an electric range.

These and other objects are obtained in the form of the invention as shown in the drawings by providing a resiliently mounted liquid filled thermostatic bulb in the center of a surface heater held against the bottom of any pan thereon. This bulb is connected by capillary tubing to a metal bellows or diaphragm operating a two-step switch mechanism. The adjusting mechanism for the bellows provides a range of temperatures and also operates a multiple switch mechanism which provides various selected low voltage connections between the two-step switch and the set of three hot wire relays which control the connection of a three element three terminal surface heating means with the high voltage supply conductors. Two different heating rates are provided for the initial heating period while five different heating rates are provided for the heating period following the initial period in the more elaborate form of the invention.

Further objects and advantages of the present invention will be apparent from the following description, reference being had to the accompanying drawings, wherein a preferred form of the present invention is clearly shown.

Figures 1, 2:
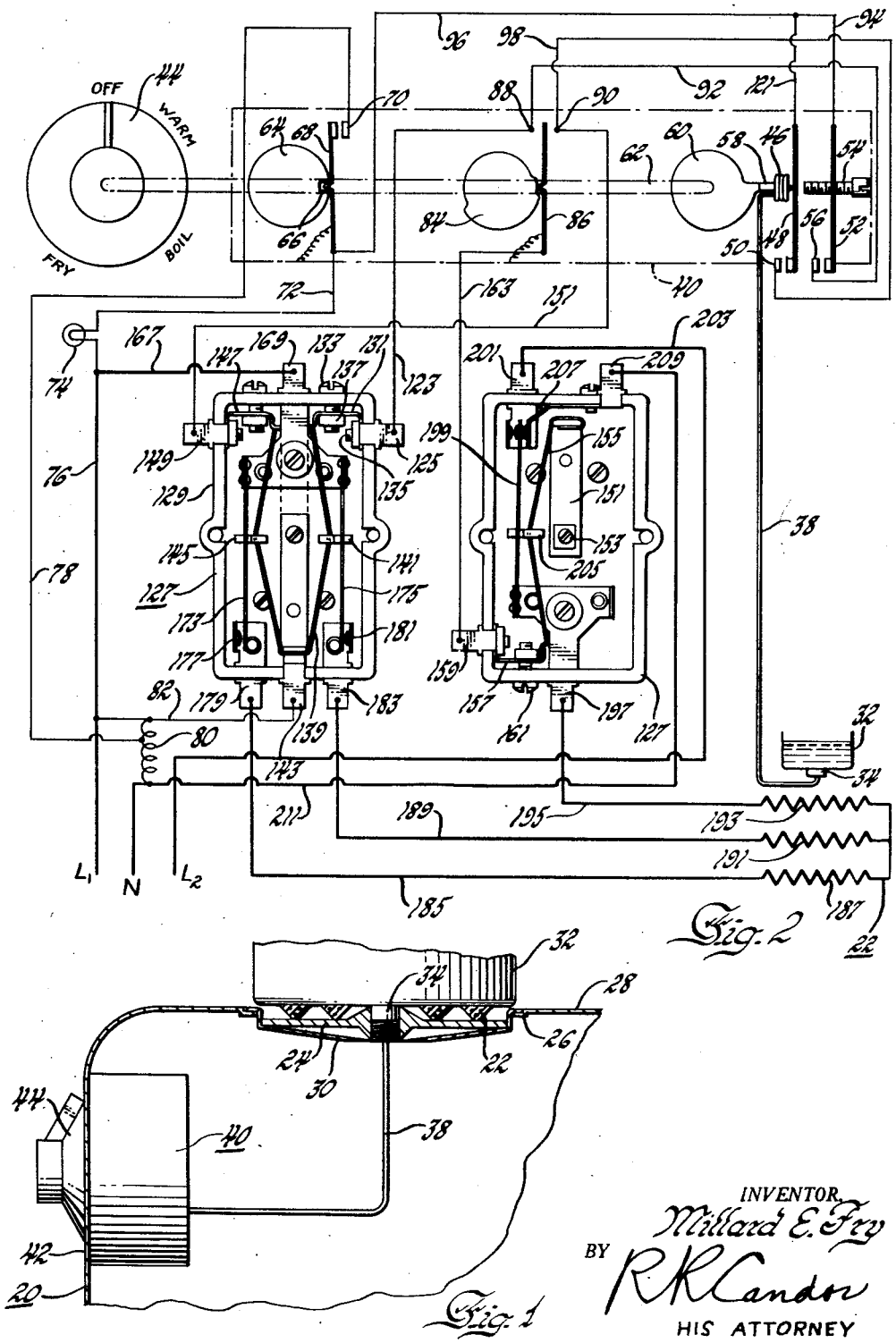
Figure 1 is a fragmentary vertical sectional view, partly diagrammatic, of a range and surface heater provided with an automatic thermostatic control embodying my invention.
Figure 2 is a wiring of the automatic surface heater thermostat and electrical control system embodying the first form of my invention.
Figures 3, 4:
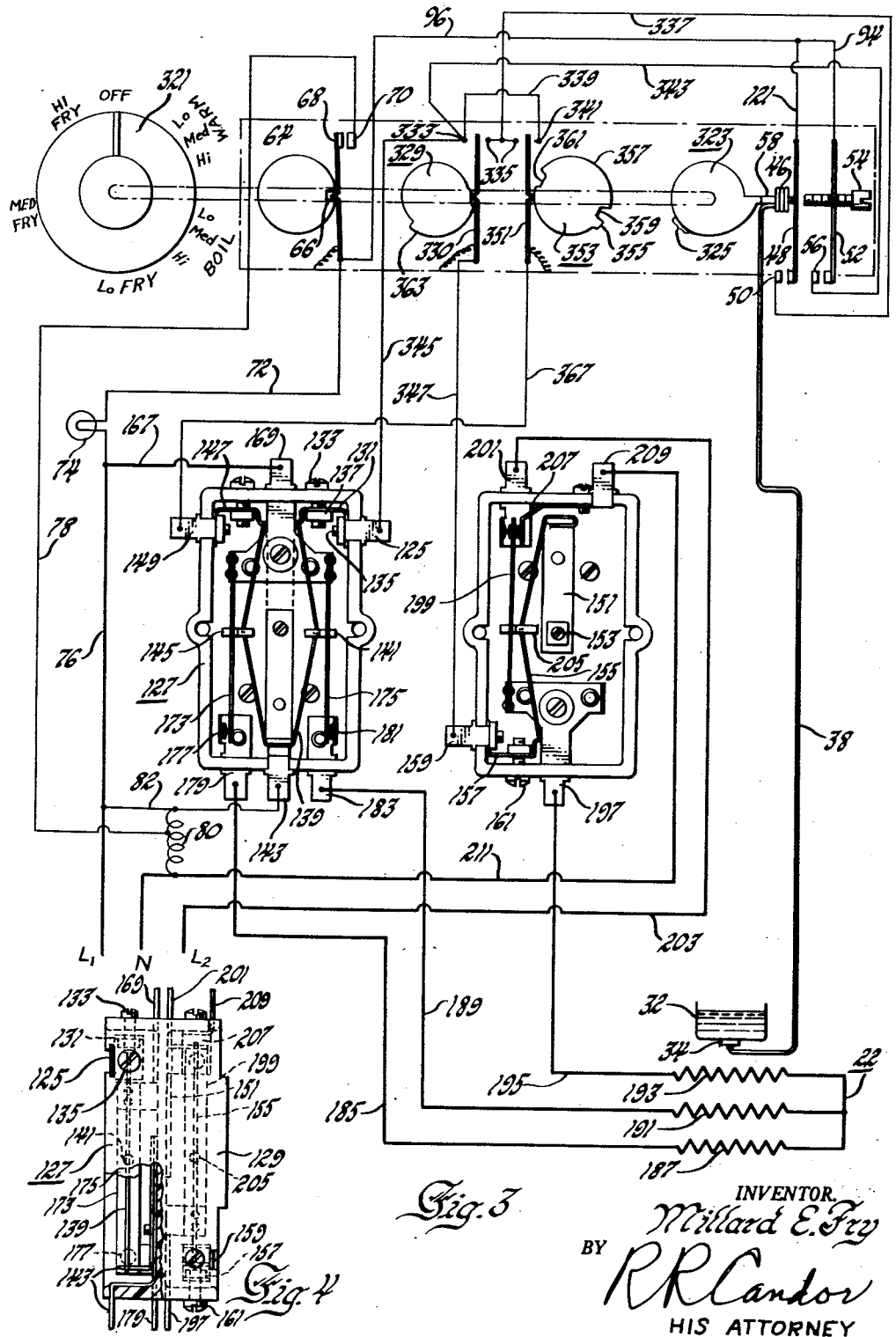
Figure 3 is a wiring diagram similar to Figure 2 but embodying a second form of my invention.
Figure 4 is a side view of the relays shown in Figure 3.

Referring to the drawings and more particularly to Figure 1, there is shown a domestic electric range 20 having a standard three element surface heater 22 supported upon a support 24 within a flanged aperture 26 in the range top 28. Beneath the heater 22 and the support 24 is a drip pan 30 having its flanges supported by the flanged edges of the aperture 26. The surface heater may be of the sheathed tubular type containing three star connected sections side by side and having three exposed terminals such as for example as shown in the Tuttle Patent No. 2,508,552, issued May 23, 1950. The surface heater 22 is adapted to support the pan or cooking vessel or receptacle 32. The heater 22 may be used for any sort of cooking for which a surface heater may be used. In the central portion of the surface heater 22 there is provided a hydraulic thermostat bulb 34 pushed upwardly against the bottom of the pan 32 by a coil spring 36 mounted in the central portion of the support 24. The hydraulic thermostat bulb 34 is connected by a capillary tube 38 to an automatic thermostatic control 40 mounted behind the front 42 of the range 20. Control 40 has an adjusting valve knob 44 mounted on the outside of the range front 42 for adjusting the thermostat and changing the circuit controls with them. The general organization of Figures 2 and 3 is the same. The difference lies in providing only two heating rates in Figure 2 following the uniform initial heating while in Figure 3 two initial heating rates and five post initial rates are provided.

*Contact chart Fig. 2*

| Pos. | Sections | | | Watts | Contacts | | | | | | | | |
|---|---|---|---|---|---|---|---|---|---|---|---|---|---|
| | 187 | 191 | 193 | | 48 50 | 52 56 | 86 88 | 86 90 | 175 181 | 173 177 | 199 201 | 199 207 | 70 68 |
| Off | 0 | 0 | 0 | 0 | open | open | open | open | open | open | open | close | open. |
| PH | | series 236v. | | 1,450 | close | close | ---do--- | close | close | close | close | open | close. |
| Low | 0 | series 118v. | | 180 | open | ---do--- | ---do--- | ---do--- | ---do--- | open | open | close | Do. |
| PH | | series 236v. | | 1,450 | close | ---do--- | close | open | ---do--- | close | close | open | Do. |
| High | 0 | series 236v. | | 720 | open | ---do--- | ---do--- | ---do--- | ---do--- | open | ---do--- | ---do--- | Do. |

Referring now more particularly to Figure 2, the pan 32 is shown diagrammatically in contact with the bulb 34 which is hydraulically connected by the capillary tube 38 to the small metal bellows 46 located within the housing of the thermostatic control 40. This system is filled with a suitable hydraulic thermally expansible liquid which upon a rise in temperature of the pan 32 will cause the bellows 46 to expand and move the first step switch 48 away from the stationary contact 50. A second step switch 52 is also provided and has a set screw 54 adapted to be engaged by the first step switch 48 when the pan 32 for the bulb 34 rises to a temperature of 25° higher than the opening temperature of the first step switch 48. The engagement of the said screw 54 opens the second step switch 52 upon moving it away from the stationary contact 56. The bellows 46 is bodily moved by the cam follower 58 operated by the cam 60 to adjust the opening temperatures of the switches 48, 50 and 52, 56. The cam 60 is shown with its high off projection in engagement with the follower 68 for holding the contacts 48, 50, 52 and 56 in the open positions when the knob 44 is in the off position. From the high projection for the off position the cam is provided with a periphery of gradually reducing radius to form a true spiral for providing a complete range of operating temperatures for the first and second step switches. This cam 60 is fixed to the shaft 62 to which the knob 44 is fixed.

Also fixed to the shaft 62 is an on-off cam 64 having a notch 66 effective in the off position 44 only to allow a switch member 68 to move away from the cooperating stationary contact 70. The contact 68 is connected by the conductor 72 to the indicating or pilot light 74 which in turn is connected by the conductor 76 to the supply conductor $L_1$. The contact 70 is connected by the conductor 78 to a low voltage output terminal of the auto transformer 80 having one combined input-output terminal connected by the conductor 82 to the supply conductor $L_1$ and a second input terminal connected to the neutral supply conductor N. The pilot light 74 is lighted under a low voltage (2½ v.) current from the auto transformer 80 whenever the knob 44 is moved away from the off position.

The shaft 62 is also provided with a control cam 84 against which is held the follower of the contact blade 86. This contact blade 86 is adapted to operate between two stationary contacts 88 and 90. The contact 88 is connected through the conductor 92, the switch members 56 and 52 and the conductors 94 and 96, the on-off switch 68, 70 and the conductor 78 to the low voltage terminal of the auto transformer 80. The contact 90 is connected through the conductor 98, the switch contacts 50 and 48, the conductors 121 and 96, the on-off switch 68, 70 and the conductor 78 to the low voltage terminal of the auto transformer 80. The contact 88 is also connected by the conductor 123 to the terminal 125 of the multiple relay 127 which is shown in structural detail. This relay 127 has an insulating support 129 in the form of a plane rectangular web surrounded by perpendicular side walls extending in both directions to form receptacles on opposite sides of the web as shown in Figures 2 to 4. The terminal 125 is L-shaped and has one portion projecting outwardly and a second portion extending downwardly into the recess. The support 129 has its rim portion notched to receive the outwardly extending projection of the terminal 125.

The terminal 125 has an irregular shaped thin spring arm 131 extending therefrom and held against the inner face of the side wall of the support 129 by a screw 135 extending through the side wall and the spring arm 131 and threaded through the inner portion of the terminal 125. The spring arm 131 is made adjustable by an adjusting screw 133 extending through the spring arm 131 and threaded into a square nut 137 on the opposite side of the spring arm 131. This square nut 137 is held from rotation by the off set end portion of the spring arm 131 which forms a wire anchorage to which is connected one end of a thermally expansible and contractable wire 139. Preferably this is Nichrome wire having a diameter of .010 inch. This wire 139 threads through a connector 141 of electrical insulating material and thence is passed around and bonded to a wire support provided upon the terminal 143 at the opposite end of the insulating support 129. The wire 139 continues from the wire support through the insulating connector 145 and is anchored at its opposite end to the wire anchoring end portion of the spring arm 147 which is similar to the spring arm 131 and is fastened to the terminal 149 in a manner similar to that previously described for the terminal 125. A similar adjusting screw and nut is also provided. The left and right halves or sections of the wire 139 operate independently. The terminal 149 is connected by the conductor 151 to the contact 90. The terminal 143 connects directly to the conductor 82 connecting with the live supply conductor $L_1$.

Upon the opposite face of the web of the support 129 there is provided an L-shaped wire anchorage 151 electrically connected through the web to the terminal and wire support 143 by the screw and nut 153. A thermally expansible and contractable wire 155 of .010 inch Nichrome extends from the anchorage 151 to the wire anchorage at the end of the spring arm 157 connected to a terminal 159 in the manner previously described for the terminal 125. The arm 157 is likewise provided with a screw and nut adjusting system 161. The terminal 159 is connected by the conductor 163 to the switch blade 86. It should be noted that all the electrical system so far described in detail is powered by the low voltage output of the auto transformer 80 providing a voltage of about 2½ volts and corresponding low current. This minimizes contact wear, contact welding and corrosion so that the parts of this system may be expected to operate without any change in calibration indefinitely. Very little insulating is required and a minimum in precautions and clearances are needed for electrical safety.

In the high voltage system, a conductor 167 connects the conductor 76 to a terminal 169. This terminal 169 is T-shaped. It is fastened to the web of the support 129 and is provided with an off set extending over the wall of the support 129. The two arms of the terminals 169 are turned at right angles and have riveted to them the spring switch blades 173 and 175. The insulated connector 141 connects to an intermediate portion of the spring contact blade 175 while the insulating connector 145 connects to an intermediate portion of the spring contact blade 173. The blade 173 is sprung so as to resiliently engage the turned up contact 177 provided on the terminal 179 while the spring contact blade 175 is sprung so as to make contact with the turned up contact 181 upon the terminal 183. The terminal 179 extends over the wall of the support 129 and is fastened to the web portion. The terminal 179 is connected by the conductor 185 to the outer terminal of the section 187 of the surface heater 22. The terminal 183 is connected by the conductor 189 to the outer terminal of the section 191. The inner ends of these sections 191 and 187 are connected together within the heater 22 and also to the inner terminal of the third element 193 of the heater 22. The outer terminal of the third element 193 is connected by the conductor 195 to the T-shaped terminal 197.

This T-shaped terminal 197 has riveted to the turned-up section upon one of its arms a spring contact blade 199 carrying at its outer movable end a double contact. This spring contact blade 199 is sprung outward so as to tend to move into contact with the turned-up contact upon the terminal 201. This terminal 201 is connected by the conductor 203 to the second live supply conductor $L_2$. However when the wire element 159 is cooled, it contracts and through the insulating connector 205 through which it extends pulls and holds the switch contact blade 193 into contact with the contact extension 207 extending from the terminal 209. This terminal 209 and the contact extension 207 are fastened to the wall section of the support 129 by a screw as shown. The terminal 209 is connected by the conductor 211 to the neutral supply conductor N.

*Operation Fig. 2*

The form shown in Figure 2 operates as follows: When the knob 44 is turned to the warm portions of its scale, the cam 60 will retract the follower 58 and the bellows 46 sufficiently to cause the contacts 48 and 50 as well as the contacts 52 and 56 to close. Simultaneously, the cam 84 will be turned to present its high portion to the follower of the switch contact blade 86 to move this blade into contact with the stationary contact 90. Also simultaneously, the cam 64 will turn its notch 66 away from the follower of the contact 68 to move this contact into contact with the stationary contact 70. This simultaneous closing of the aforementioned contacts immediately causes a current flow through all the low voltage circuits. This current flow will energize the indicating light 74 and will heat both sections of the wire 139 and will also heat the wire 155.

This will allow the contact blade 199 to move into engagement with the terminal 201 to connect the element 193 with the live supply conductor $L_2$. The expansion of the left section of the wire 139 will allow the blade 173 to engage the contact 177 to connect the element 187 to the live supply conductor $L_1$. The expansion of the other section of the wire 139 allows the switch contact blade 175 to engage the contact 181 to connect the element 191 to the live supply conductor $L_1$. This connects the elements 187 and 191 in parallel with each other and in series with the element 193 causing the live supply conductors $L_1$ and $L_2$ to provide a maximum input wattage of 1450 watts for a standard six inch surface unit and 2050 watts for a standard eight inch surface unit.

When the pan 32 is heated sufficiently to bring it up to the temperature selected by the knob 44, the hydraulic liquid within the bulb 34 will be expanded sufficiently to flow through the capillary tube 38 and expand the bellows 46 sufficiently to separate the contact members 48 and 50. This will stop the current flow through the wire 155 as well as the left section of the wire 139. These wire sections therefore will contract and pull the spring blades 199 and 173 toward them. This will move the blade 199 into engagement with the contact extension 207 to connect the element 193 to the neutral supply conductor N. The contraction of the left section of the wire 139 will separate the contact members 173 and 177 thereby disconnecting the section 187 from the live supply conductor $L_1$. This deenergizes the section 187. The sections 191 and 193 remain connected in series between the live supply conductor $L_1$ and the neutral supply conductor N to reduce the voltage applied to 118 volts and to reduce the input wattage to 180 watts for a standard six inch surface unit and 265 watts for a standard eight inch surface unit. This heating rate is sufficient to raise the pan 32 and its contents to a slow boil. Any rise in temperature more than 25° above the temperature selected by the knob 44 such as would occur if the pan 32 should boil dry will cause the switch member 48 to engage the set screw 54 to move the switch contact blade 52 away from its stationary contact 56. This will stop the flow of current through the right section of the wire 139. This causes the right section of the wire 139 to cool and contract thereby pulling the switch blade 175 away from the upturned contact 181 to deenergize the sections 191 and 193 thereby completing the deenergization of the surface heater 22. The maximum temperature will thereby be limited by the opening and closing contacts 52 and 56 which accomplish this by cycling continuously. This prevents over-heating and burning of foods being warmed or slow boiled.

If it is desired to fast boil or fry, the knob 44 is turned to the positions so designated. This will turn the cam 84 so that it presents a low portion to the switch contact blade 86 thereby causing the blade 86 to move away from the contact 90 and to engage the stationary contact 88. This does not affect the operation during initial heating before the switch contacts 48 and 50 are opened. However after the switch contacts 48 and 50 are opened the current flow through the wire 155 is not terminated but continues through the contacts 52 and 56, the conductor 92, the contacts 88 and 86 and the conductor 163 to the terminal 159. This continuance of current flow keeps the contact blade 199 in contact with the contact of the terminal 201. In this position of the knob 44, the opening of the contacts 48 and 50 continues to terminate the flow of current through the left section of the wire 139 so that the switch blade 173 is separated from the contact 177 of the terminal 179 to disconnect the element 187 from the live supply conductor $L_1$.

The sections 191 and 193 remain connected in series across the live supply conductors $L_1$ and $L_2$ to apply a voltage of 236 volts for a maximum input of 720 watts for a standard six inch surface unit and 1065 watts for a standard eight inch surface unit. This provides sufficient heating for fast boiling and frying. Should the heat be too great to maintain the temperature selected, the contacts 52 and 56 will cycle at a temperature 25° higher than the temperature selected to alternately deenergize and energize the sections 191 and 193. Should this rate of heat be insufficient to maintain the selected temperature, the contacts 48 and 50 will reclose the restore the energization of the preheat circuit used in the initial heating. In this way the temperatures are suitably controlled and regulated.

*Contact chart Fig. 3*

| Pos. | Sections | | | Watts | Contacts | | | | | | | | | |
|---|---|---|---|---|---|---|---|---|---|---|---|---|---|---|
| | 187 | 191 | 193 | | 48 50 | 52 56 | 330 333 | 330 335 | 351 335 | 351 341 | 175 181 | 173 177 | 199 201 | 199 207 |
| Off | 0 | 0 | 0 | 0 | opn | opn | opn | opn | opn | opn | opn | opn | opn | clo. |
| PH | 0 | series 236v. | | 720 | clo | clo | opn | clo | opn | opn | clo | opn | clo | opn. |
| Warm | 0 | series 118v. | | 180 | opn | clo | opn | clo | opn | opn | clo | opn | opn | clo. |
| OH | 0 | 0 | 0 | 0 | opn | opn | opn | clo | opn | opn | opn | opn | opn | clo. |
| PH | series 236v. | | | 1,450 | clo | clo | opn | clo | clo | opn | clo | clo | clo | opn. |
| Low | 0 | series 118v. | | 180 | opn | clo | opn | clo | clo | opn | opn | opn | opn | clo. |
| OH | 0 | 0 | 0 | 0 | opn | opn | opn | clo | clo | opn | opn | opn | opn | clo. |
| PH | series 236v. | | | 1,450 | clo | clo | opn | clo | opn | opn | clo | clo | clo | opn. |
| Med | series 118v. | | | 360 | opn | clo | opn | clo | opn | clo | clo | clo | opn | clo. |
| PH | series 236v. | | | 1,450 | clo | clo | clo | opn | clo | clo | clo | clo | clo | opn. |
| High | 0 | series 236v. | | 720 | opn | clo | clo | opn | clo | clo | clo | opn | clo | opn. |
| PH | series 236v. | | | 1,450 | clo | clo | clo | opn | opn | clo | clo | clo | clo | opn. |
| DFF | series 236v. | | | 1,450 | opn | clo | clo | opn | opn | clo | clo | clo | clo | opn. |

In Figure 3, portions identical to Figures 1 and 2 bear the same reference characters while new or altered portions bear reference characters above 300. In the figures the surface heaters as well as the relays, the pilot light system and the two-step thermostat excepting for the adjusting cam may be identical in both figures.

The knob 321 however differs from the knob 44 in that it has a wide boiling section marked low, medium and high which is located between the warm and dry positions or ranges of adjustment. It also has a deep fat fry position beyond the fry range or positions. The adjusting cam 323 which actuates the follower 58 differs from the cam 60 only in that it has a section 325 of constant radius orientated to engage the follower 58 when the knob 321 is turned to use the low, medium or high boil positions. This section of constant radius 325 provides an opening temperature of the switch members 48 and 50 of 200° F. The knob 321 is connected to the adjusting cam 323 by a shaft 327 on which is fixed the pilot light cam 64.

Also fixed to this shaft 327 is a switch operating cam 329 having a portion of intermediate radius for holding the follower portion of the double throw switch blade 330 in an intermediate position when the knob 321 is in the off position. The blade 330 operates between the stationary contacts 333 and 335. The contact 335 may be a double contact and is connected by the conductor 337 to the stationary contact 50. The contact 333 is connected by the conductor 339 to a stationary contact 341. The contact 333 is also connected by the conductor 343 to the stationary contact 56. The contact 333 is also connected by the conductor 345 to the terminal 125 of the relay 127. The double throw switch blade 330 is connected by the conductor 347 to the terminal 159 of the relay 127.

A switch blade 351 is operated between the contacts 335 and 341 by a cam 353 fixed to the shaft 327. The switch cam 353 has a portion of intermediate radius which contacts the follower of the switch blade 351 in the off position and the warm positions of the knob up to but not including any portion of the boil range. When the knob 321 is in its low boil the high boil and the fry position it has portions 355 and 357 of large radius engaging the follower of the switch contact blade 351 to move and hold the blade in contact with the contact 335. The cam 353 also has low portions 359 and 361 between the portions 355, 357 and the portion of intermediate radius which are presented to the follower of the switch contact blade 351 when the knob 321 is in the medium boil and the deep fat fry positions to move the follower 351 into engagement with the stationary contact 341.

The cam 329 has a portion 363 of large radius extending from the short off portion of intermediate radius clockwise through an arc corresponding to the warm, low boil and medium boil positions of the knob 321. From the portion 363 the cam 329 has a portion of small radius extending clockwise through an arc which corresponds to the high boil, fry and deep fat fry positions of the knob 321 to the off postiion of intermediate radius. This small radius portion of the cam 329 is presented to the follower of the switch contact blade 330 in these high boil, fry and deep fat fry positions of the knob 321 to move and hold the blade 330 in contact with the stationary contact 333.

*Operation of Fig. 3*

When the knob 321 is in the off position, the contacts 68, 70, 330, 48, 50 and 52 to 56 will be in the open position as indicated in the contact chart. The thermally expansive wires 139 and 155 will be completely deenergized thereby holding the switch contact blades 173 and 175 in the open circuit position and holding the switch contact blade 199 in contact with the contact extension 207 connecting through the terminal 209 and the conductor 211 to the neutral supply conductor N. When the knob 321 is turned to any part of the warm position, the contacts 68 and 70 will be closed to light the indicating light 74 and to provide a connection to contacts 48, 50 and 52, 56. The portion 363 of the cam 329 moves the double throw switch blade 330 into contact with the double contact 335. In the warm and off positions only, the contact blade 351 will remain in the open position. The cam 323 will be turned to a position closing the contacts 48 and 50 and also closing the contacts 52 and 56.

Low voltage current will flow from the low voltage output terminal of the auto transformer 80 through the conductor 78, the contacts 68, 70, the conductors 90 and 121 through the contacts 48 and 50, the conductor 337, the contacts 335 and 330, the conductor 347, the terminal 59, the spring arm 157, the thermally expansible and contractable wire 155, the wire support 151, the bolt 153, the terminal 143 and the conductor 82 to the second low voltage terminal of the auto transformer 80 which also connects to the live supply conductor $L_1$. Low voltage current also flows through the conductor 96, the conductor 94, the contacts 52 and 56, the conductor 343, the conductor 345, the terminal 125, the spring arm 131, the right section of the termally expansible and contractable wire 139, the terminal 143 and the conductor 82 to the second terminal of the auto transformer 80 and also to the live supply conductor $L_1$.

The wire 155 will expand allowing the switch contact blade 199 to move slowly into contact with the contact connected to the terminal 201 thereby allowing current to flow from the live supply conductor $L_2$ through the conductor 203 and the blade 199, the terminal 197, the conductor 195, the section 193, the section 191, the conductor 189 to the terminal 183. The right section of the wire 139 will also be expanded allowing the switch contact blade 175 to slowly engage the contact upon the terminal 133 so that current will flow from the terminal 183 through the blade 175, the terminal 169, the conductors 167 and 76 to the second live supply conductor $L_1$. The section 187 will remain deenergized. The heater sections 191 and 193 will therefore be connected in series across the live supply conductors $L_1$ and $L_2$ to provide a maximum input of 720 watts for a standard six inch surface unit and 1065 watts for a standard eight inch surface unit.

When the pan 32 and the thermostat bulb 34 reach the temperatures selected by the position of the knob 321 the bellows 46 will separate the contacts 48 and 50 thereby terminating the flow of low voltage current through the wire 155. This will cause the wire 155 to contract and slowly pull the switch blade 199 out of engagement with the contact upon the terminal 201 into engagement with the contact extension 207 connecting through the terminal 209 and the conductor 211 with the neutral supply conductor N. This places the elements 191 and 193 in series across the supply conductors $L_2$ and N at 118 volts for a maximum wattage input of 180 watts for a standard six inch surface unit and 265 watts for a standard eight inch surface unit. The selected current flow and wire size make the movement of the switch blade 199 slow enough to eliminate flash overs and hunting and rapid enough to prevent short cycling. Should the temperature rise more than 25° F., the expansion of the bellows 46 will cause the switch contact member 48 to engage the set screw 54 and separate the contacts 52 and 56. This will deenergize the right section of the wire 139 causing it to cool and contract to slowly pull the switch contact blade 175 to the open circuit position to completely deenergize the circuit. The slow opening of the blade 175 minimize arcing. Subsequent cooling of the pan 32 and the bulb 34 will cause cycling of the contacts 56 and 52 and cycling of the blade 175 to limit the temperature of the plan 32 to 25° above the selected temperature to prevent burning of food. In this warming range, the preheat rate is approximately one-half the preheat rate in other positions. The purpose of this is to prevent overheating or overshooting of the selected temperature. Otherwise the residual heat in the surface heater would increase the temperature of the pan 32 even after all circuits were deenergized.

For boiling and higher temperatures, the maximum preheat speed is desired. Therefore in all these positions the maximum heating rate of 1450 watts for a standard six inch surface unit and 2050 watts for a standard eight inch surface unit is provided. When the knob 321 is turned to the low and medium boil positions, the cam 329 will continue to hold the switch member 330 in contact with the double contact 335. In the low boil position, the projection 355 of the cam 353 engages a follower of the contact member 351 and moves the member 351 into engagement with the double contact 335. The turning of the knob 321 to such a position will cause a closing of the contacts 48 and 50, 52 and 56. Low voltage current will flow through the conductor 78, the contacts 68, 70, the conductors 96 and 121, the contacts 48 and 50, the conductor 337, the contacts 335 and 330, the conductor 347, the terminal 159, the spring arm 157, the wire member 155, the spring anchorage 151, a bolt 153, terminal 143, and the conductor 82 to the second terminal of the auto transformer 80 and the supply conductor L₁. This causes heating and expansion of the wire member 155 allowing the switch contact blade 199 to move slowly into contact with the contact upon the terminal 201 thereby connecting the live supply conductor L₂ through the conductor 203, terminal 201, the switch contact blade 199, the terminal 197 and the conductor 195 to the outer end of the section 193.

Low voltage current will also flow from the double contact 335 to the switch contact blade 351, the conductor 367, the terminal 149, the spring arc 147, the left section of the wire 139 and the terminal 143 to the second terminal of the auto transformer 80. This will heat and expand the left section of the wire 139 allowing the switch contact blade 173 to engage slowly the contact 177 upon the terminal 179. This will connect the outer terminal of the element 187 through the conductor 185, the terminal 179, the contact 177, the switch contact blade 173, the terminal 169 and the conductors 167 and 76 to the live supply conductor L₁.

Low voltage current will also flow from the conductor 96 through the conductor 94, the contacts 52 and 56, the conductor 343 to conductor 345, the spring arm 131, the right section of the wire member 139, the terminal 143, and the conductor 82 to the second terminal of the auto transformer 80 and the live supply conductor L₁. This current flow will heat and expand the right wire section 139 allowing the switch blade 175 to move slowly into contact with the contact on the terminal 183. This will connect the outer terminal of the element 191 through the conductor 189, the terminal 183, the switch contact blade 175, the terminal 169 and the conductors 167 and 76 to the live supply conductor L₁. This connects the sections 191 and 187 in parallel with each other and in series with the sections 193 across the live supply conductors L₁ and L₂ at 236 volts for a maximum input of 1450 watts for a standard six inch surface unit and 2050 watts for a standard eight inch surface unit.

In the low, medium and high boil positions the contacts 48 and 50 open when the thermostat bulb 34 reaches a temperature of 200° F. The deenergization of the wire 155 causes it to cool quickly and contract slowly, pulling the switch contact blade 199 slowly out of contact with the contact upon the terminal 201 and into contact with the contact extension 207. This causes the outer terminal of the section 193 to change its connection from the live supply conductor L₂ to the neutral supply conductor N. This reduces the voltage applied to 118 volts. The opening of the contacts 48 and 50 also deenergizes the left section of the wire 139 causing it to cool and contract and to pull the switch contact blade 173 slowly away from the contact 177 to disconnect the outer terminal of the section 187 from the live supply conductor L₁. This leaves the sections 193 and 191 connected in series across the supply conductors L₁ and N at 118 volts for the maximum input of 180 watts for a standard six inch surface unit and 265 watts for a standard eight inch surface unit. This provides sufficient heat for a slow boil and reduces to a minimum the evaporation of water from the pan 32. It however is sufficient normally to raise the temperature slowly from after the opening of the contacts 48 and 50 to the boiling point with the aid of the heat stored in the surface heater 22 during the preheat period. Should the pan boil dry, the rise in temperature of the thermostat bulb 34 to a temperature of 225° will open the contacts 52 and 56 to deenergize the right section of the wire member 139 to disconnect the outer terminal of the section 191 from the live supply conductor L₁ to completely deenergize the heater 22. The contacts 52 and 56 will cycle at this temperature to keep the pan at about 225° F. to prevent any substantial rise or fall in temperature.

When the knob 321 is turned to the medium boil position, the switch blade 330 remains in contact with the double contact 335 but the follower of the switch blade 351 drops into the notch 359 of the cam 353 causing the blade 351 to move into engagement with the stationary contact 341. The control of the left section of the wire 139 shifts from the contacts 48 and 50 to the contacts 56 and 52. The wire 155 remains under the control of the contacts 48 and 50. During the preheat period all circuits are energized, causing the surface units to be energized at their maximum inputs. When the thermostat bulb 34 reaches a temperature of 200° F. and the contacts 48 and 50 open, the current flow through the wire 155 will be stopped causing it to cool and contract and slowly move the switch blade 199 out of connection with the terminal 201 and into engagement with the contact switch 207. This will change the connection of the outer terminal of the element 193 from the live supply conductor L₂ to the neutral supply conductor N to reduce the applied voltage of 118 volts and to reduce the maximum input to 360 watts for a standard six inch surface unit and 510 watts for a standard eight inch surface unit. This is sufficient to bring the pan 32 rapidly to the boiling temperature following the preheat period and to keep the water boiling in the pan at a medium boil.

Should the pan 32 boil dry, the contacts 52 and 56 will open at about 225° F. to deenergize both sections of the wire 139 to open the switch contact blades 173 and 175 to disconnect both the outer terminals 187 and 191 from the live supply conductor L₁. This will completely deenergize the surface heater 22. Subsequent cooling will cause the cycling of the contacts 52 and 56 and cycling of the switch blades 173 and 175 to maintain the temperatures of the pan 32 at about 225° F.

When the knob 321 is turned to the high boil or the high fry positions up to about 350°, the projection 363 of the cam 329 moves away from the follower of the switch contact blades 330 to allow the blade to move into contact with the stationary contact 333. The projection 357 of the cam 353 will move into engagement with the follower of the switch contact 351 to move it into engagement with the stationary contact 335. As long as both sets of thermostat contacts 48 and 50 and 52 and 56 are closed, all of the wire sections will be energized to close the switch contact blades 173 and 175 and to allow the blade 199 to move into engagement with the terminal 201 to energize all three sections of the surface heater 22 at 236 volts for a maximum input of 1450 watts for a standard six inch surface unit and 2050 watts for a standard eight inch surface unit.

When the temperature is reached corresponding to the position of the knob 321, the contacts 48 and 50 will open thereby deenergizing the left section of the wire 139 causing it to cool and contract and to pull the switch contact blade 173 to the open position. This will deenergize the section 187 of the surface heater 22. The sections 191 and 193 will remain connected in series across the supply conductors L₁ and L₂ at 236 volts for a maximum input of 720 watts for a standard six inch surface unit and 1065 for a standard eight inch surface unit.

Should the temperatures of the thermostat bulb 34 rise more than 25° F. above the selected temperature the contacts 32 and 36 will open to deenergize the right section of the wire 139 to open the switch contact blade 175 and disconnect the outer terminal of the element 191 from the live supply conductor L₁. At the same time the wire 155 will be deenergized and its subsequent cooling and contraction will move the switch contact blade 199 out of engagement with the contact upon the terminal 201 and into engagement with the contact extension 207 to connect the outer terminal of the element 193 to the neutral supply conductor N. This will completely deenergize the heater 22. The contacts 52 and 56 and the switch contact members 199 and 175 will cycle to maintain the selected temperatures plus 25° of the pan 32. This heat rate is sufficient for fast boiling and all frying excepting deep fat frying.

When the knob 321 is turned to temperatures above 350° for deep fat frying, the switch contact blade remains in contact with the stationary contact 333. The knob 361 of the cam 353 is presented to the follower of the switch contact blade 351 allowing this blade to move into contact with the stationary contact 341. This places all wire sections under the control of the contacts 52 and 56. The contacts 48 and 50 are disconnected from the wire sections and their opening will not change the energization of the circuit but the energization will remain the same as in the preheat arrangement and the surface heater 22 will continue at the maximum input wattage of 1450 watts for a standard six inch surface unit and 2050 watts for a standard eight inch surface unit until the contacts 52 and 56 open. These contacts 52 and 56 as well as the switch contact blades 173 and 175 and 199 will cycle to maintain the temperature of the pan 32 at the selected temperature. This provides quick recovery upon reclosing of the contacts 52 and 56 so that the heating rate is sufficient to maintain the temperatures necessary for satisfactory deep fat frying. However overheating is effectively prevented.

In the wiring diagrams, the low voltage circuits are indicated in light lines while the high voltage circuits are indicated in heavy lines. The system shown and described herein provides adequate control of temperatures and adequate heating rates for all surface heating requirements and yet prevents burning, scorching, overheating and overshooting. The use of low voltage control circuits including the thermostat control avoids contact difficulties which might affect the calibration of the system. The use of the slow make and break hot wire relays avoids alternating current difficulties and flash over encountered in magnetic relays. The parts are simple, reliable and relatively inexpensive.

In accordance with the provisions of Rule 78a reference is made to the following prior filed applications: S. N. 396,210 filed December 4, 1953, now abandoned, S. N. 407,642 filed February 2, 1954, S. N. 464,767 filed October 26, 1954, now Patent 2,790,056, S. N. 467,715 filed November 9, 1954.

While the form of embodiment of the invention as herein disclosed constitutes a preferred form, it is to be understood that other forms might be adopted, as may come within the scope of the claims which follow.

What is claimed is as follows:

1. An electrical heating system for heating receptacles on the top of a support including power supply conductors, an electric surface heating means having connected sections, an adjustable two step thermostat substantially responsive to the temperature of any receptacle upon said surface heating means, said thermostat having successively operating first and second step switches, said thermostat having an adjusting means having a range of adjustment having means increasing opening temperatures for said first and second step switches, said surface heating means having three terminals; said power supply means including two live supply conductors and a neutral supply conductor; selective control means having first, second, third and fourth positions, said control means in all the positions having means effective for holding connected two of said terminals to one of said live supply conductors and the third terminal to the other live supply conductor when said first and second step switches are closed and for holding disconnected two of said terminals and for holding connected third terminal to the neutral supply conductor when both said first and said second step switches are open and in said first position only for holding disconnected one of said terminals and for holding connected the second terminal to one of the live supply conductors and the third terminal to the neutral supply conductor when the first step switch is open and the second step switch is closed and in said second position only for holding connected two of said terminals to one of the live supply conductors and the third terminal to the neutral supply conductor when the first step switch is open and the second step switch is closed and in said third position only for holding disconnected one of said terminals and for holding connected one of the other terminals to each of the live supply conductors when said first step switch is open and said second step switch is closed and in said fourth position only holding connected the two terminals to one of the live supply conductors and the third terminal to the other live supply conductor when said first step switch is open and said second step switch is closed.

2. An electrical heating system for heating receptacles on the top of a support including power supply conductors, an electric surface heating means having connected sections, an adjustable two step thermostat substantially responsive to the temperature of any receptacle upon said surface heating means, said thermostat having successively operating first and second step switches, said thermostat having an adjusting means having a range of adjustment having means increasing opening temperatures for said first and second step switches, said surface heating means having three terminals; said power supply means including two live supply conductors and a neutral supply conductor; selective control means having first, second, third and fourth positions, said control means in all the positions having means effective for holding connected two of said terminals to one of said live supply conductors and the third terminal to the other live supply conductor when said first and second step switches are closed and for holding disconnected two of said terminals and for holding connected third terminal to the neutral supply conductor when both said first and said second step switches are open and in said first position only for holding disconnected one of said terminals and for holding connected the second terminal to one of the live supply conductors and the third terminal to the neutral supply conductor when the first step switch is open and the second step switch is closed and in said second position only for holding connected two of said terminals to one of the live supply conductors and the third terminal to the neutral supply conductor when the first step switch is open and the second step switch is closed and in said third position only for holding disconnected one of said terminals and for holding connected one of the other terminals to each of the live supply conductors when said first step switch is open and said second step switch is closed and in said fourth position only holding connected the two terminals to one of the live supply conductors and the third terminal to the other live supply conductor when said first step switch is open and said second step switch is closed, said control means also having a fifth position and said means effective in said fifth position only holding disconnected one of said terminals and holding connected a second terminal to one of said live supply conductors and the third terminals to the other live supply conductors when both said first and second step switches are closed and for holding said second terminal connected to said neutral supply conductor when said first step switch is open and said second step switch is closed.

3. An electrical heating system for heating receptacles on the top of a support including power supply conductors, an electric surface heating means having connected sections, an adjustable two step thermostat substantially responsive to the temperature of any receptacle upon said surface heating means, said thermostat having successively operating first and second step switches, said thermostat having an adjusting means having a range of adjustment having means increasing opening temperatures for said first and second step switches, said surface heating means having three terminals; said power supply means inciuduing two live supply conductors and a neutral supply conductor; selective control means having first, second, third and fourth positions, said control means having means effective in said first position for holding one of said terminals disconnected and for holding a second terminal connected to one of said live supply conductors and the third terminal connected to the other live supply conductors and effective in the second third and fourth positions for holding connected two of said terminals to one of said live supply conductors and the third terminal to the other live supply conductor when said first and second step switches are closed and for holding disconnected two of said terminals and for holding connected third terminal to the neutral supply conductor when both said first and said second step switches are open and when said first step switch is open and said second step switch is closed effective in the first and second positions only for holding disconnected one of said terminals and for holding connected the second terminal to one of the live supply conductors and the third terminal to the neutral supply conductor and effective in the third position only for holding connected two of said terminals to one of the live supply conductors and the third terminal to the neutral supply conductor and effective in the fourth position only for holding disconnected one of said terminals and for holding connected one of the other terminals to each of the live supply conductors.

4. An electrical system including a terminal member having a plurality of flexible switch blades connected thereto, two terminal members each having a contact portion cooperating with one of said switch blades, two terminal members each providing a wire anchorage, a terminal member providing a wire support, thermally expansible and contractable wire means extending from said wire anchorages to said wire support, connectors of electrical insulating means connecting said wire means and each of said switch blades to move the switch blades according to the expansion and contraction of said wire means, electric circuit means connected to the terminals of said wire means, and means for controlling the flow of current through said electric circuit means to control the movement of said switch blades.

5. An electrical system including a terminal member having a plurality of flexible switch blades connected thereto, two terminal members each having a contact portion cooperating with one of said switch blades, two terminal members each providing a wire anchorage, a terminal member providing a wire support, thermally expansible and contractable wire means extending from said wire anchorages to said wire support, connectors of electrical insulating means connecting said wire means and each of said switch blades to move the switch blades according to the expansion and contraction of said wire means, electric circuit means connected to the terminals of said wire means, and means for controlling the flow of current through said electric circuit means to control the movement of said switch blades, an insulating support of electrical insulating material for supporting said terminals, the opposite side of said insulating support being provided with a terminal member having a double throw switch blade connected thereto, a terminal member mounted upon said insulating support providing one contact cooperating with said double throw switch blade, a terminal member mounted upon said insulating support providing a second contact cooperating with said double throw switch blade, another wire support on the insulating support electrically connected to the first mentioned wire support, a terminal member provided with another wire anchorage, a second thermally expansible and contractable wire anchorage extending between said another support and another anchorage, a second electric circuit connected to a terminal of the second wire means, and means for controlling current flow in said second circuit.

6. An electrical heating system for heating a receptacle on top of a support including a three wire single phase power supply having two live supply conductors and a neutral supply conductor, an electric surface heating means adapted to support a receptacle and having three terminals, a double throw switch means connecting one terminal alternately with one of said live supply conductors and with said neutral supply conductor, a thermostatic control circuit including a temperature responsive contact means substantially responsive to the temperature of the receptacle and a temperature responsive wire having one portion operably connected to said temperature responsive means for controlling the flow of current through said wire, said circuit including a terminal provided with a spring member connected to said wire, a threaded adjustment means for said spring member to adjust the position of said wire, said double throw switch means being connected to and operated by the expansion and contraction of said wire for connecting and disconnecting said one terminal of said heating means alternately to and from the one live supply conductor and the neutral conductor.

References Cited in the file of this patent
UNITED STATES PATENTS

| | | |
|---|---|---|
| 684,094 | Potter | Oct. 8, 1901 |
| 1,868,500 | Hanel | July 26, 1932 |
| 2,270,496 | Bell | Jan. 20, 1942 |
| 2,276,930 | Clark | Mar. 17, 1942 |
| 2,399,423 | Bletz | Apr. 30, 1946 |
| 2,479,372 | Knobel | Aug. 16, 1949 |
| 2,552,480 | Dickey | May 8, 1951 |
| 2,602,132 | Young | July 1, 1952 |
| 2,689,289 | Bell | Sept. 14, 1954 |
| 2,697,150 | Altherr | Dec. 14, 1954 |
| 2,767,295 | Cutler | Oct. 16, 1956 |